United States Patent
Schulz et al.

(10) Patent No.: US 7,182,506 B2
(45) Date of Patent: Feb. 27, 2007

(54) PAINT MIXER BALANCING APPARATUS AND METHOD

(75) Inventors: Daniel Schulz, St. Michael, MN (US); Oszkar Rohosy, Minneapolis, MN (US)

(73) Assignee: Red Devil Equipment Company, Plymouth, MN (US)

( * ) Notice: Subject to any disclaimer, the term of this patent is extended or adjusted under 35 U.S.C. 154(b) by 406 days.

(21) Appl. No.: 10/891,446

(22) Filed: Jun. 30, 2004

(65) Prior Publication Data

US 2006/0002229 A1 Jan. 5, 2006

(51) Int. Cl.
B01F 11/00 (2006.01)

(52) U.S. Cl. .................................... 366/217

(58) Field of Classification Search ........ 366/108–128, 366/208–217, 219, 605; 74/86
See application file for complete search history.

(56) References Cited

U.S. PATENT DOCUMENTS

| | | | | |
|---|---|---|---|---|
| 3,891,191 | A * | 6/1975 | Choules et al. | 366/111 |
| 4,235,553 | A * | 11/1980 | Gall | 366/208 |
| 4,497,581 | A | 2/1985 | Miller | |
| 4,619,532 | A * | 10/1986 | Schmidt, III | 366/110 |
| 5,268,620 | A | 12/1993 | Hellenberg | |
| 6,575,614 | B2 * | 6/2003 | Tosco et al. | 366/114 |
| 6,953,279 | B2 * | 10/2005 | Midas et al. | 366/217 |
| 2003/0067838 | A1 | 4/2003 | Schmidt et al. | |
| 2003/0107949 | A1 | 6/2003 | Huckby et al. | |
| 2004/0085855 | A1 | 5/2004 | Midas et al. | |
| 2004/0141412 | A1 | 7/2004 | Midas et al. | |
| 2006/0002228 | A1 * | 1/2006 | Schulz et al. | 366/209 |
| 2006/0002229 | A1 * | 1/2006 | Schulz et al. | 366/217 |

FOREIGN PATENT DOCUMENTS

| | | | |
|---|---|---|---|
| EP | 0007220 A1 * | 1/1980 | |
| EP | 0 274 802 B1 | 7/1988 | |
| FR | 2 738 861 A1 | 3/1997 | |
| JP | 61-161128 * | 7/1986 | |
| JP | 2000-176268 | 6/2000 | |
| JP | 2001-246236 | 9/2001 | |
| WO | WO 2004/037400 A2 | 5/2004 | |

OTHER PUBLICATIONS

Speed Demon 5 Paint Mixer Owner's Manual, Red Devil Equipment Co., Jan. 29, 2003, pp. 1-24.
5900 Case Shaker Owner's Manual, Red Devil Equipment Co., Jun. 2004, pp. 1-24.
Auto Sperse 5600 Paint Mixer Owner's Manual, Red Devil Equipment Co., 1996, pp. 1-13.

* cited by examiner

Primary Examiner—Charles E. Cooley
(74) Attorney, Agent, or Firm—Faegre & Benson LLP

(57) ABSTRACT

An improved apparatus and method for balancing paint mixers including pivotably supporting a mixing frame assembly and suspending the assembly by at least one spring for mixing a liquid coating using both spin and orbital rotational movements and adjusting the lowest rotational resonant frequencies of the mixing frame assembly to be substantially below the lower of a pair of forcing function frequencies corresponding to the spin and orbit velocities. Optionally one or more dampers may be used to damp pivoting movement of the mixing frame assembly.

43 Claims, 15 Drawing Sheets

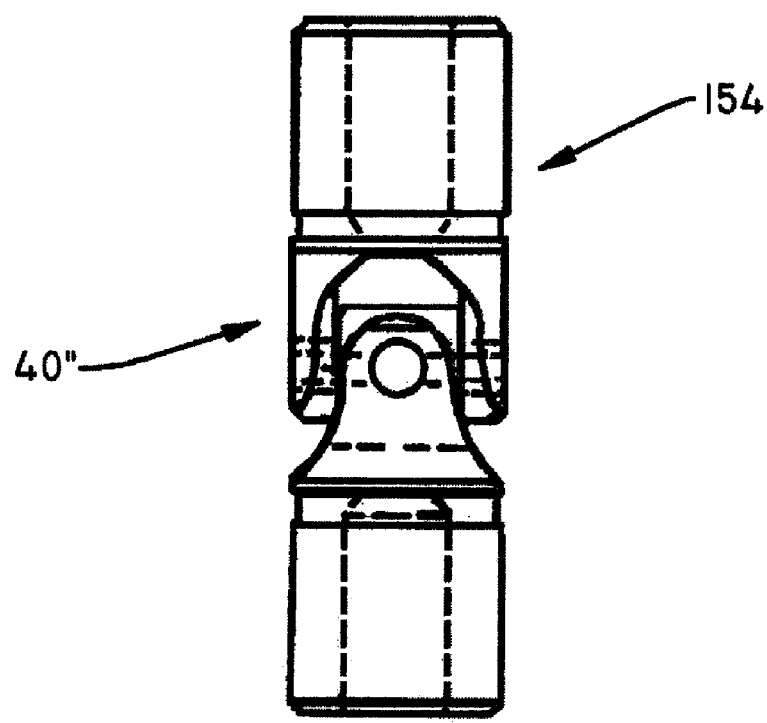

PAINT MIXER BALANCING APPARATUS AND METHOD

BACKGROUND OF THE INVENTION

In the past, vortex mixers have been used to mix pigment and vehicle in liquid coatings such as paint, typically in 5 gallon cylindrical containers. Such vortex mixers achieved mixing by spinning the container on its cylindrical axis, while that axis was positioned at an angle to a central orbit axis about which the container was simultaneously orbited as well as spun. While such vortex mixers have enjoyed a degree of popularity, they have also been subject to a certain amount of imbalance, caused by a range of density and viscosity in the coatings being mixed. While a vortex was created in the liquid coating, the vortex assumes different shapes and positions within the container, depending upon the density, viscosity and the spin and orbit speeds of the mixer.

Some prior art mixers had a center of volume offset from the centers of rotation such that the center of mass was displaced in one direction with an empty machine, and the center of volume was displace in an opposite direction, such that adding a mass of liquid to be mixed brought the rotating elements somewhat into balance. However, such balance was only achieved with one volume, density and viscosity of liquid to be mixed.

Imbalance in prior art mixers manifested itself in vibration of the mixer, sometimes resulting in the mixer "walking" or moving laterally across the surface upon which it was supported. Such walking is undesirable, particularly when the mixer is located on a surface elevated above a floor, as for example, when the mixer is "stacked" on top of other equipment in the paint mixing facility.

The present invention achieves an improved performance for vortex mixers by decoupling the vibrations caused by imbalance from the frame of the mixer and stops the mixer from "walking." In alternative embodiments, one or more dampers reduce the amplitude of vibration.

SUMMARY OF THE INVENTION

The present invention includes an apparatus and method wherein a mixing frame and rotating components, including a container holder and the coating container are mounted with a pivoting single point attachment to the base of the mixer and supported for reciprocating motion with respect to the base by a plurality of springs, with the ratio of effective spring constant(s) to mass moment of inertia sized to lower the resonant frequency or frequencies of the suspended mass of the mixer significantly below the lowest driving frequency of the reciprocating motion, at least for the significant rotational degrees of freedom of the mixer. Characteristically, the driving frequencies correspond to the spin and orbit speeds. The more significant degrees of freedom of the mixer of the present invention are characteristically about a roll and a pitch axis, each orthogonal to an orbit axis of the mixer. The yaw degree of freedom may also be addressed in the practice of the present invention to reduce vibratory rotational motion about the orbit axis. In a further embodiment, damping elements such as dashpots or shock absorbers are connected between the suspended mass and the base of the mixer, as are the spring suspension elements.

BRIEF DESCRIPTION OF THE DRAWINGS

FIG. 16 is a side elevation view of another alternative embodiment for a pivoting support using a U-joint in the practice of the present invention.

DETAILED DESCRIPTION OF THE INVENTION

Figure 1:
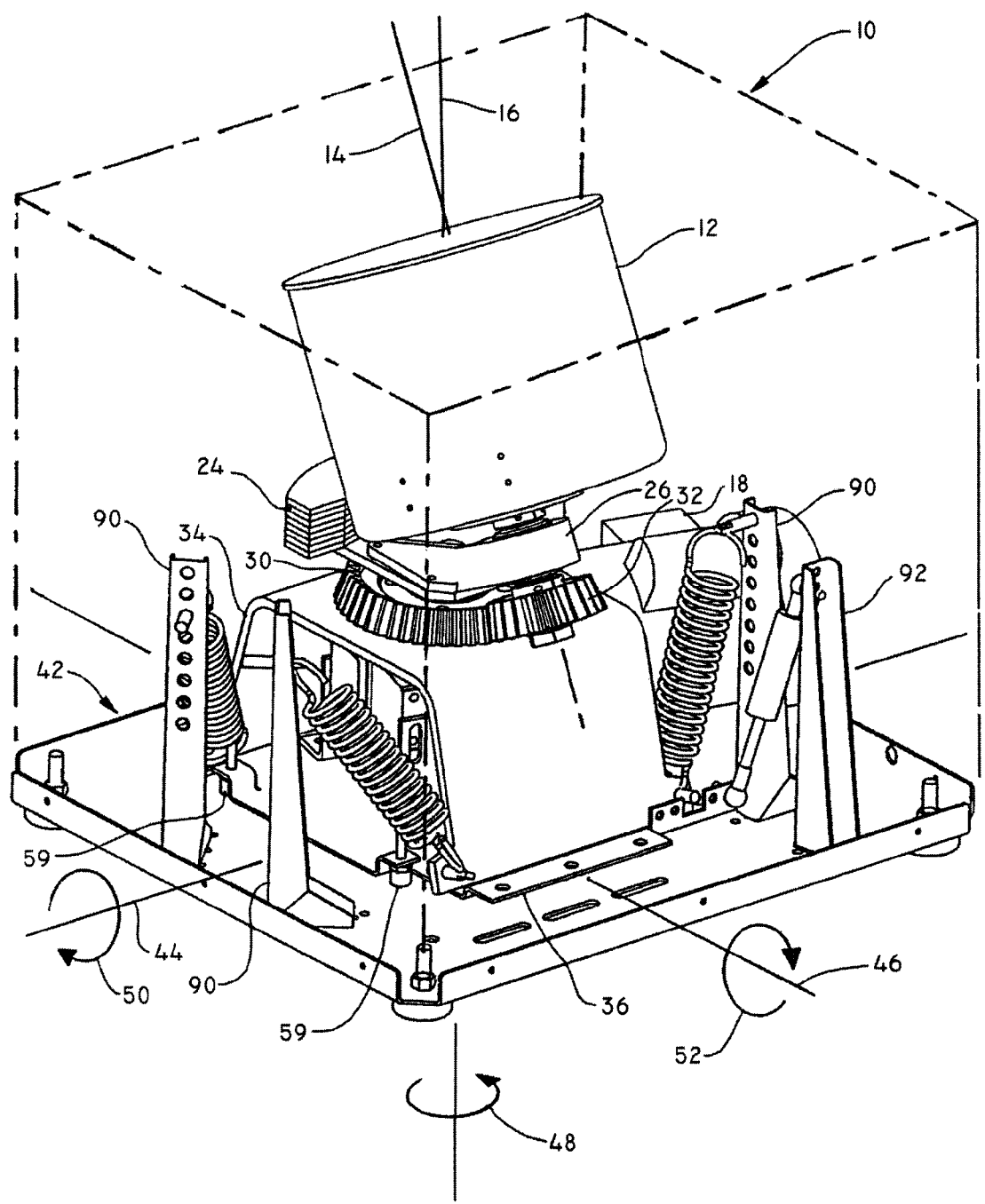
FIG. 1 is an assembly view of an embodiment of the present invention in the form of a vortex mixer with single pivot support and with an enclosure shown in phantom.

The present invention is directed to design goals of increasing mix consistency, and reducing mixing times, while at the same time improving stabilization of the mixing machine since certain prior art designs were prone to 'walk' while mixing certain coating liquids.

It has been found preferable to decrease a gear reduction ratio between an electric motor driving the mixer to increase both the spin and orbit rotational speeds resulting in improved mixing action.

To increase machine stability the mixer of the present invention has been designed to seek balance for the mixing machine in all configurations, including i) empty, ii) loaded with 5 gallon bucket, and iii) loaded with 1 gallon can using an adapter. Balance is achieved in the empty state by balancing all rotating components. The best balance in the other configurations is achieved by positioning the paint container average center of mass on both a spin axis and an orbit axis.

A deficiency in some prior art designs was that the machine was not balanced in the empty condition. Adding a paint product to the assembly brought the assembly's center of mass close to the orbit axis, which provided some balance.

Because paint is approximately homogeneous, positioning the center of volume also generally positions the center of mass. It has been found, however, that rotational balance is dependent on the density and viscosity of the paint or other coating to be mixed. As used herein, the term "paint" is understood to include paint and all other similar liquid coatings requiring mixing, typically to blend pigment and vehicle.

Another aspect of the present invention improves machine isolation by decreasing machine resonance frequencies in the 3 rotational degrees of freedom (DOF) (rotation around three mutually orthogonal x, y, and z axes). The resonance frequency or frequencies are decreased to a point substantially less than the driving frequencies which correspond to the rotational velocities of the spin and orbit motions. It has been found that reducing the resonance frequency to be less than or equal to $1/\sqrt{2}$ times the lowest driving frequency or approximately 0.7 times the lowest driving frequency is desirable.

A machine's natural frequency is a function of mass and spring rate. Because the mass of the coating liquid load varies, the machine's natural frequency varies. A deficiency of some prior art designs was that the spring rate(s) of the isolators was very stiff, resulting in the machine operating at or near resonance with certain liquid product weights. Decreasing the spring rate significantly in the present invention brings the natural frequency (with and w/o product) much below the operating frequency.

A decrease in the spring rate in all 6 degrees of freedom (DOF) is not particularly desirable due to issues with loading (the can holder is not stable, and tends to move when the operator bumps the holder while loading). In addition, shipping the machine is complicated when all 6 DOF are left 'loose'.

In connection with the present invention, it has been determined that it is desirable to isolate the rotational DOF, while the translational DOF can be ignored (or positively restrained). Using a pivoting support such as a ball joint between a base of the machine and a mixing frame assembly carrying the paint container holder to allow rotational movement, but restricting translation between the mixing frame assembly and the base, allows more stability when loading liquid product into the mixer, and makes the mixer easier to prepare for shipment.

It has also been found desirable to add dampers to decrease transmissibility when the machine spins up, and down (passing through resonance).

In connection with the present invention, it has been found convenient, (but not essential) to match resonance frequencies in the 3 rotational degrees of freedom, to result in fewer natural frequencies.

It has also been found convenient, but not essential, to balance the mass across the center plane running vertically along the lateral centerline of the machine (dividing the machine left-right).

Referring to the Figures, and most particularly to FIG. 1, a vortex mixer 10 embodying the present invention may be seen. Mixer 10 has a paint container holder 12 in the form of cylindrical bucket adapted to receive a paint container, typically cylindrical. The mixer 10 shown is sized to mix paint in a 5 gallon container, but it is to be understood that the present invention is not limited to any particular size of paint container. To mix the paint, the mixer 10 rotates the holder 12 about a spin axis 14 and an orbit axis 16.

Figure 2:
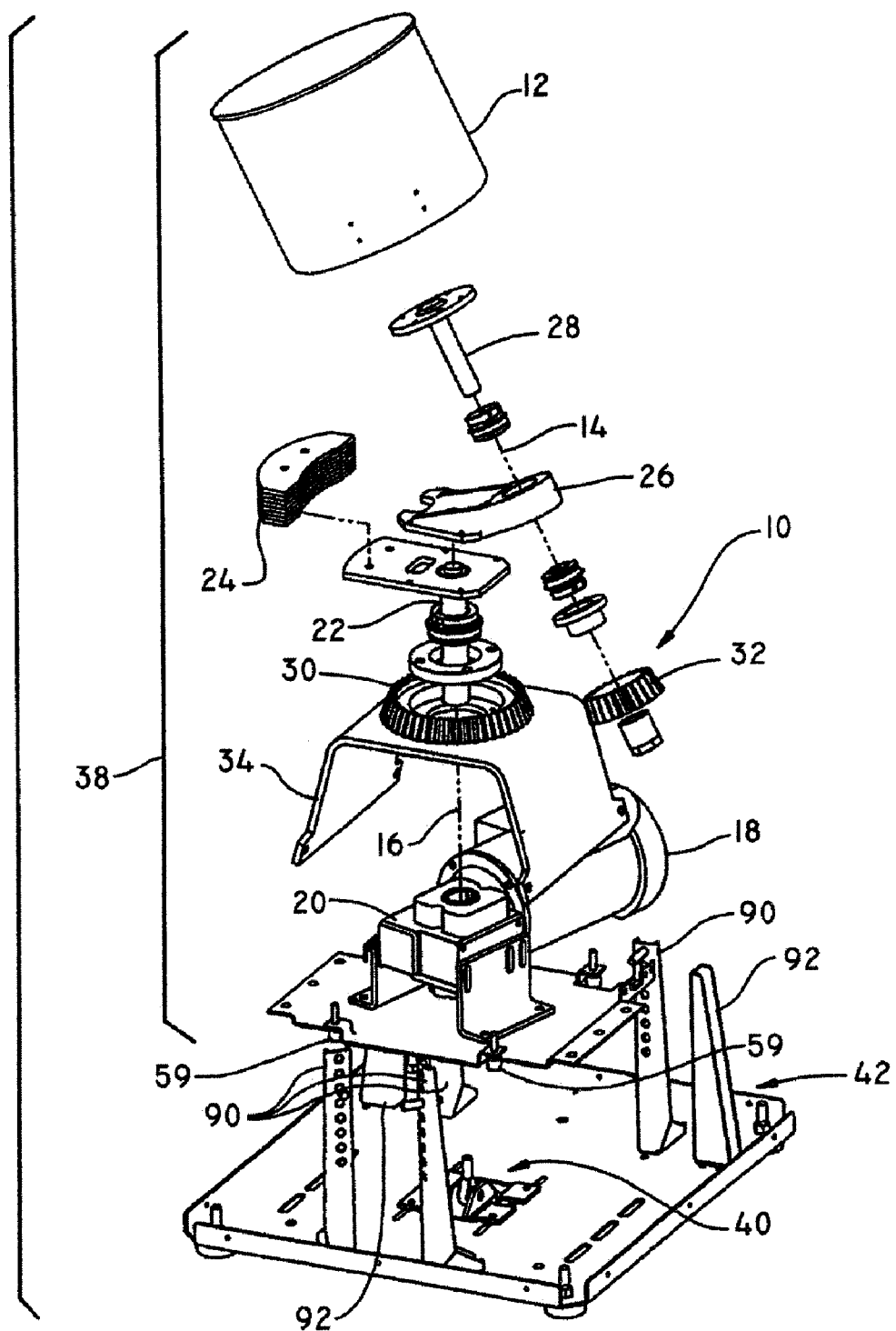
FIG. 2 is an exploded view of the vortex mixer of FIG. 1 with parts omitted for clarity.

Referring now also to FIG. 2, an electric motor 18 operates through a right angle gear reducer 20 to rotate an orbit shaft 22 carrying a counterweight 24 and a rotating arm 26 on which the holder 12 is mounted using a spin shaft 28 supported for rotation about a stationary bevel ring gear 30 via a pinion gear 32. Gear 30 is supported by a top mix frame weldment 34 which is affixed, for example, by welding, to a bottom mix frame weldment 36. The components of the holder 12 through the bottom mix frame weldment 36 make up a mixing frame assembly or paint container holder assembly 38, which may or may not also include the liquid paint and container (not shown).

Mixing frame assembly 38 is supported by a single pivoting support 40 on a base 42. Support 40 permits the mixing frame assembly to pivot about base 42 in at least two directions (and in some embodiments, three directions), and may prevent substantial lateral or linear motion between assembly 38 and base 42. For convenience, three mutually orthogonal axes 16, 44, and 46 are shown in FIG. 1, with conventions assigned as follows: axis 16 is a "z" axis, axis 44 is an "x" axis, and axis 46 is a "y" axis. The pivoting or rotational directions of yaw, pitch and roll about the z, x and y axes are indicated, respectively by arrows 48, 50, and 52. It is to be understood that these conventions are arbitrary and not limiting, and are used to illustrate certain features of the present invention. Furthermore, the directional arrowheads on arrows 48, 50, and 52 are arbitrary and not to be taken as limiting. (Corresponding rotational directional arrows 48,' 50,' and 52' in the following drawings are to be understood to be bidirectional.)

A plurality of elastomeric bumpers 59 are provided to act as cushions at the end of travel for the movement of the mixing frame assembly 38 when it comes into contact with base 42, for example, while loading or unloading the paint container from the holder.

Figure 3:
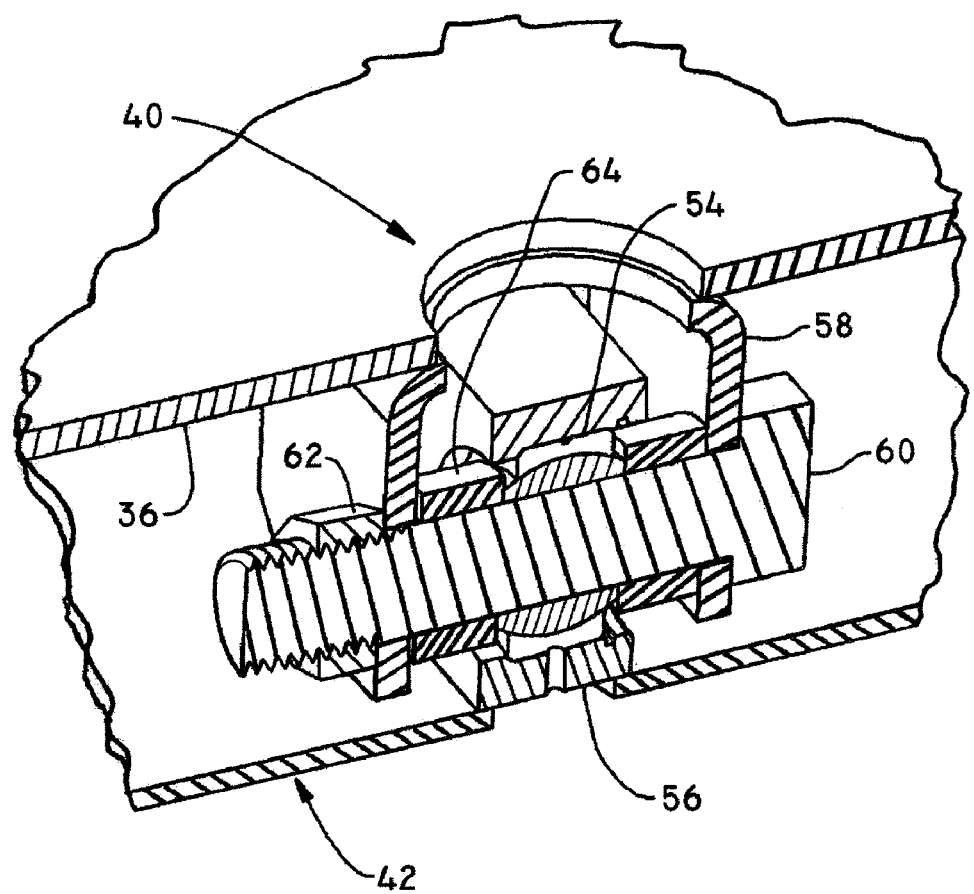
FIG. 3 is a fragmentary detail view of a single pivot support useful in the practice of the present invention.

FIG. 3 is an enlarged fragmentary view of an alternative pivoting support 38, using a spherical bearing 54 with a bearing retainer block 56 and a U-shaped flange 58, secured together by a machine screw 60, nut 62, and spacers 64. Flange 58 is preferably welded to the underside of bottom mix frame weldment plate 36, and retainer block 56 is preferably secured to base 42 by a pair of machine screws 66 (see FIG. 6). It is to be understood that other structures may be used for the pivoting support, such as a clevis and pin arrangement, a universal joint, or an elastomeric mounting device. Furthermore, it is to be understood that in the practice of the present invention, the roll, pitch and yaw axes do not necessarily need to pass through a single point, but may in fact be displaced, if desired. However, one desirable aspect of a paint mixer is to reduce the height to which a paint container must be lifted to be inserted into the holder 12, and consequently, it has been found desirable to have the height of the pivoting support 38 be minimized to the extent practicable.

Figure 3A:
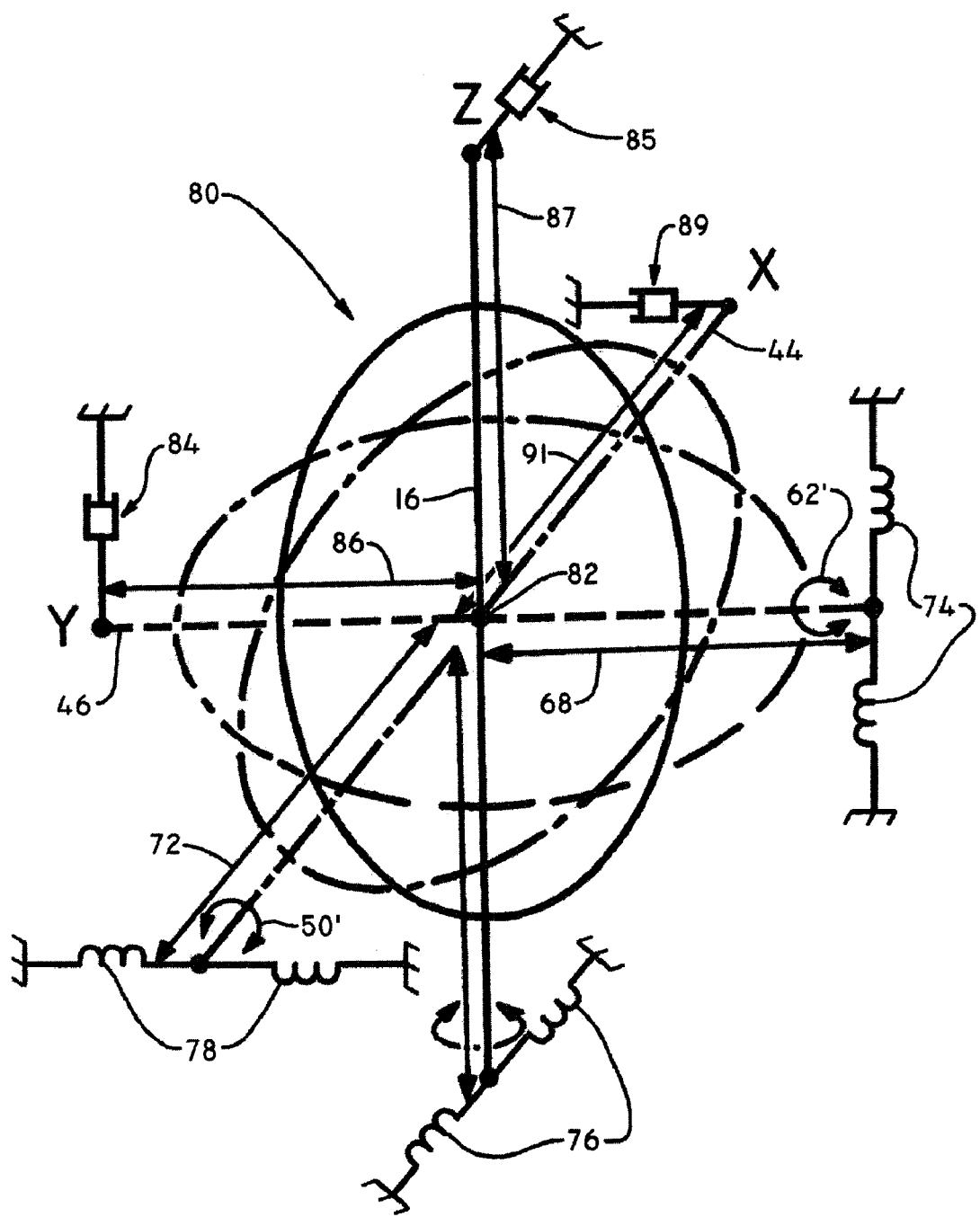
FIG. 3A is a simplified 3 dimensional force diagram to illustrate certain aspects of the present invention.

FIG. 3A is a simplified 3 dimensional force diagram to illustrate certain aspects of the present invention. An idealized or simplified conceptual model 80 includes three pair 74, 76, 78 of springs perpendicular to each of the x, y and z axes 44, 46, 16.

The equivalent moment arm or radius that each pair of springs acts through is indicated by dimensions or radii 68, 70, and 72. Roll springs 74 act through the roll radius 68, to react to roll motion in the roll rotational directions indicated by arrow 50'. Pitch springs 76 act through the pitch radius 70 to react to pitch motion in the pitch rotational directions indicated by arrow 52.' Yaw springs 78 act through the yaw radius 72 to react to yaw motion in the yaw rotational directions indicated by arrow 48.' The equivalent mass and mass moment of inertia for each of the three rotational directions or degrees of freedom are to be understood to be centered at the origin 82 of model 80. It is to be understood that the origin 82 corresponds to one or more pivot points in the pivoting structure, whether one or more than one pivot point (i.e., there may be separate or congruent pivot points for each axis of rotation) exists in the pivoting structure.

Each of the x, y and z (roll, pitch and yaw) axes may be characterized by a plane perpendicular to the respective axis, and a two dimensional model for determining the natural frequency in each of the planes may be represented by Equation (1):

$$\omega_n = (k_t/J)^{1/2} \quad (1)$$

where $\omega_n$ is the natural frequency, $k_t$ is an effective torsional spring constant, and J is the mass moment of inertia about the rotational axis of interest (of the mixing frame assembly 38) taken with respect to the pivot point for that axis in the pivoting structure.

In the simple model, if damping is present, $$\zeta = \lambda/2(k_t J)^{1/2} \quad (2)$$

where $\zeta$ is the damping coefficient and $\lambda$ is the scalar coefficient of a damper according to:

$$F = \lambda dL/dt \quad (3)$$

where F is the force produced by the moving damper, and dL/dt is the velocity at which the operating parts of the damper move with respect to each other. It is to be understood that one or more equivalent dampers may be added to one or more of the axes in parallel with one or more of the springs 74, 76, 78, it being understood that each damper may be located at a different radius than its corresponding spring, with consequent difference in leverage with respect to the respective axis on which it acts. In FIG. 3A, a roll damper 84 is illustrated at a damper radius of dimension 86 to damp roll motion 50 about the x or roll axis 44. Similarly, a pitch damper 85 is illustrated at a pitch damper radius 87 to damp pitch motion about the y or pitch axis 46. A yaw damper 89 is shown schematically at a yaw damper radius 91 to retard yaw rotational motion about the z or yaw axis 16.

The frequency at which a forcing function will result in an undamped or underdamped system exhibiting its peak amplitude response is the resonant frequency. For undamped systems, the resonant frequency and natural frequency are the same. For underdamped systems with damping (i.e., $\zeta < 1$) the resonant frequency is related to the natural frequency through the damping coefficient $\zeta$ by equation (4):

$$\omega_{resonance} = \omega_n (1 - \zeta^2)^{1/2} \quad (4)$$

Thus it can be seen that the resonant frequency is less than the natural frequency for such underdamped systems, but as damping is reduced, the resonant frequency converges to the natural frequency.

In the model illustrated in FIG. 3A, the springs and damper are shown located perpendicular to the moment arms (radii) through which they act on the mass having its respective polar moments of inertia centered at 82. However, in practice, it has been found desirable to reposition the springs (and dampers if any) to react with the mass and respective rotational inertial components of the mixing frame assembly, both to reduce the volume that would otherwise be needed (if the springs and dampers were perpendicular to the moment arms as shown in FIG. 3A) and also because it has been found desirable to have the individual actual springs (and dampers, if used) react to rotation motion in more than one direction or DOF. In other words, in one aspect of the practice of the present invention, one actual spring can serve as an effective spring in two or three rotational dimensions. For symmetry and balance, however, it has been found preferable to have the springs operate in pairs on opposite sides of the pivoting support.

It is also desirable to have a compact "footprint" or small plan view area for vortex paint mixers, to make efficient use of the space needed for the mixer. To that end, the suspension system of the present invention is "folded" or collapsed to reduce the mixer footprint. While the "unfolded" condition of the suspension system is shown in FIG. 3A, in practice it is desirable to reduce the size of the space required by the suspension system of the present invention. Furthermore, by realigning the springs (and dampers, if used) in the practice of the present invention, one actual spring can be made to deliver forces equivalent to two or more theoretical springs illustrated in FIG. 3A., thus reducing the cost as well as the size of the mixer embodying the present invention.

Referring now most particularly to FIGS. 4–7, certain views of the base 42 and suspension 88 for the mixing frame assembly 38 of the present invention may be seen. It is to be understood that the design of suspension 88 is symmetric about line VI—VI in FIG. 5, but such symmetry is not required in the practice of the present invention. Comparing the embodiment shown in these Figures with that of FIGS. 1 and 2, it may be seen that in the practice of the present invention, either individual towers 90 may be used or combined towers or upright members 94 may be used for the springs (and dampers, if used). In FIGS. 1 and 2, each spring is supported by a separate tower 90, forming a first plurality of towers. Using such an arrangement allows each spring to be individually oriented to the mixing frame assembly 38 as desired. Similarly, if dampers are used with this approach, each damper may be supported and oriented individually from a respective tower 92 from a second plurality of towers. In the embodiment shown in FIGS. 4–12, a pair of towers or upright members 94, 96 may each be used to support a pair of springs (and dampers, if desired). More particularly, a front member 94 supports a first pair of springs 98, 100 at the front of mixer 10, and a rear member 96 supports a second pair of springs 102, 104 towards a rear of mixer 10. The springs and dampers shown in FIGS. 1 and 2 may be the same as those shown in the later Figures, or may be varied, as desired, according to the principles described infra for selecting and orienting springs and dampers. It is to be understood that side members may be used instead of front and rear members in an alternative embodiment (not shown) in the practice of the present invention. Furthermore, various other combinations of spring and damper supports may be used, for example, a single upright member (not shown, but similar to a combined version of members 94 and 96) while remaining with the scope of the present invention.

Since the design shown in FIGS. 4–12 is symmetric about line VI—VI, only one side will be described, it being understood that the following description applies equally to parts for the other side. Front spring 98 is angled towards the mixing frame assembly in three dimensions (i.e., it is not aligned parallel to any of the x, y, or z axes as shown, for purposes which will be described infra. Spring 102 is shown generally parallel to the x-z plane, but may be angled, as indicated by dashed line 106, if desired, while still remaining within the scope of the present invention. If used, a damper 108 may be oriented in a two or three dimensional angle, again according to principles described infra.

Figure 5:
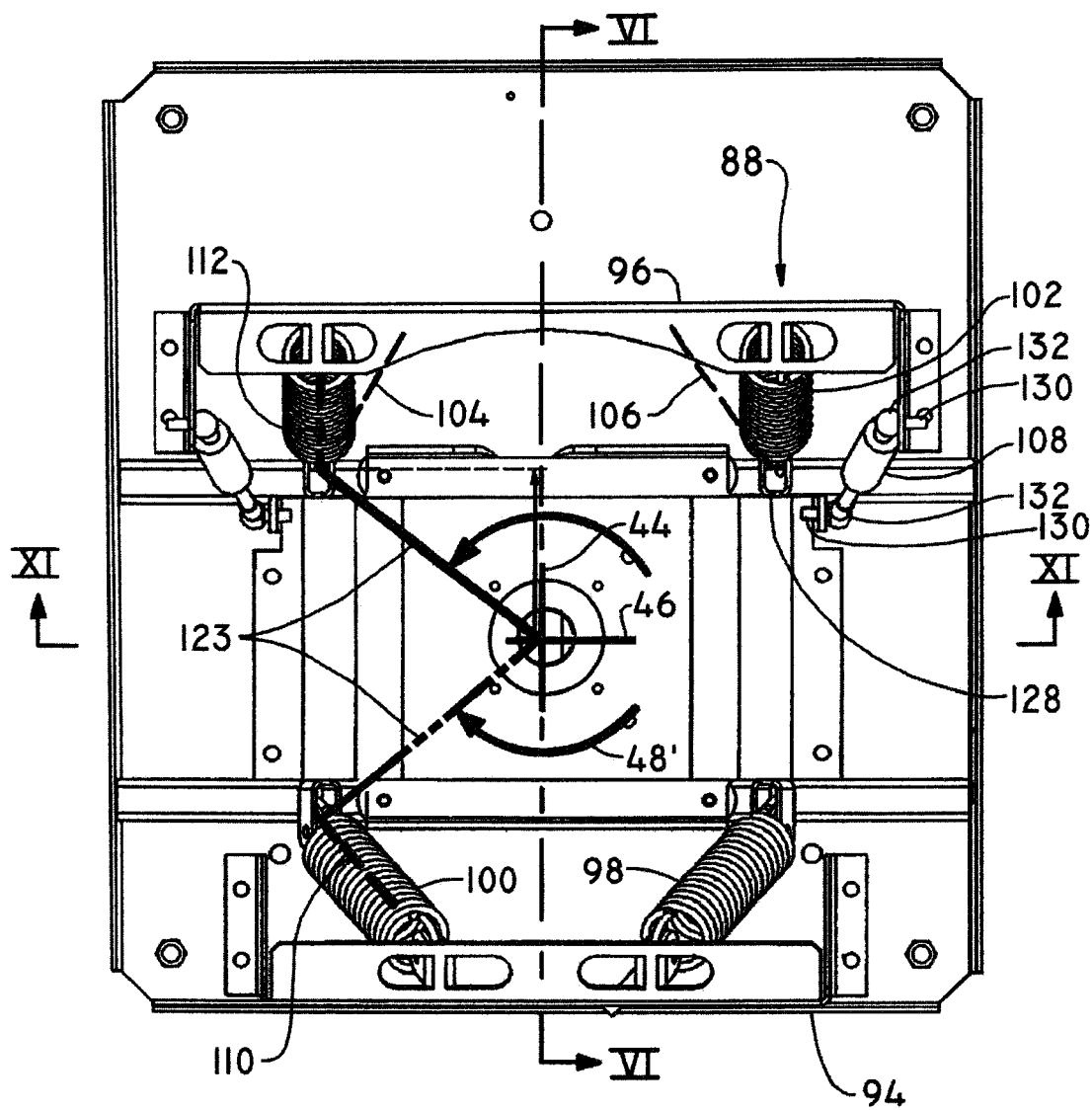
FIG. 5 is a top plan view of suspension parts for the vortex mixer according to FIG. 4, illustrating certain details of the present invention.

In FIG. 5, viewing the mixer parts perpendicular to the x-y plane, it may be seen that vector components of the respective forces of springs 100 and 104 will exist in the x-y plane along dashed lines 110 and 112 to counteract a yaw rotational movement 48' of the mixing frame assembly 38.

Figure 6:
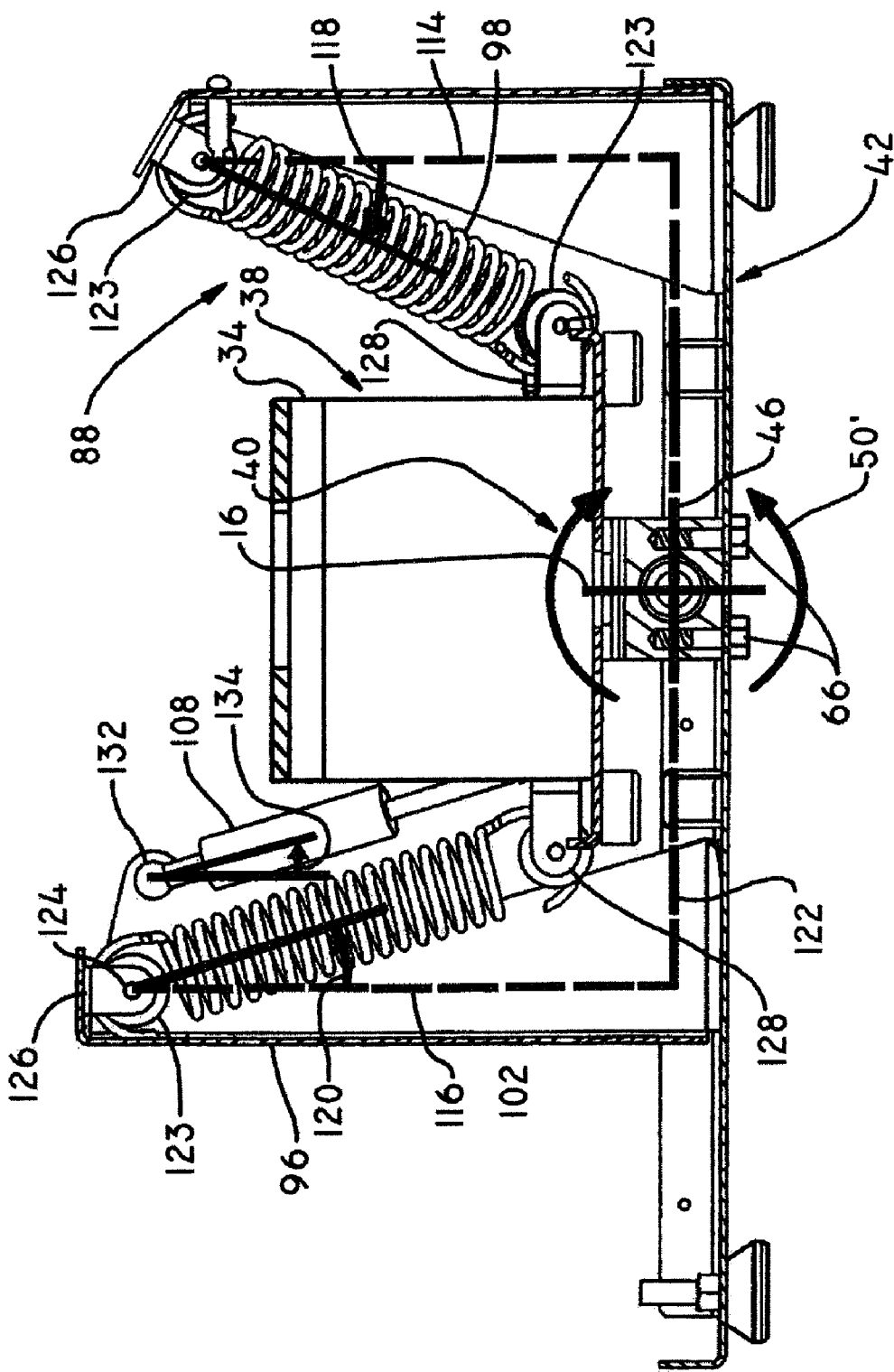
FIG. 6 is a side elevation section view of the parts shown in FIG. 5, taken along line VI—VI of FIG. 5.
Figure 7:
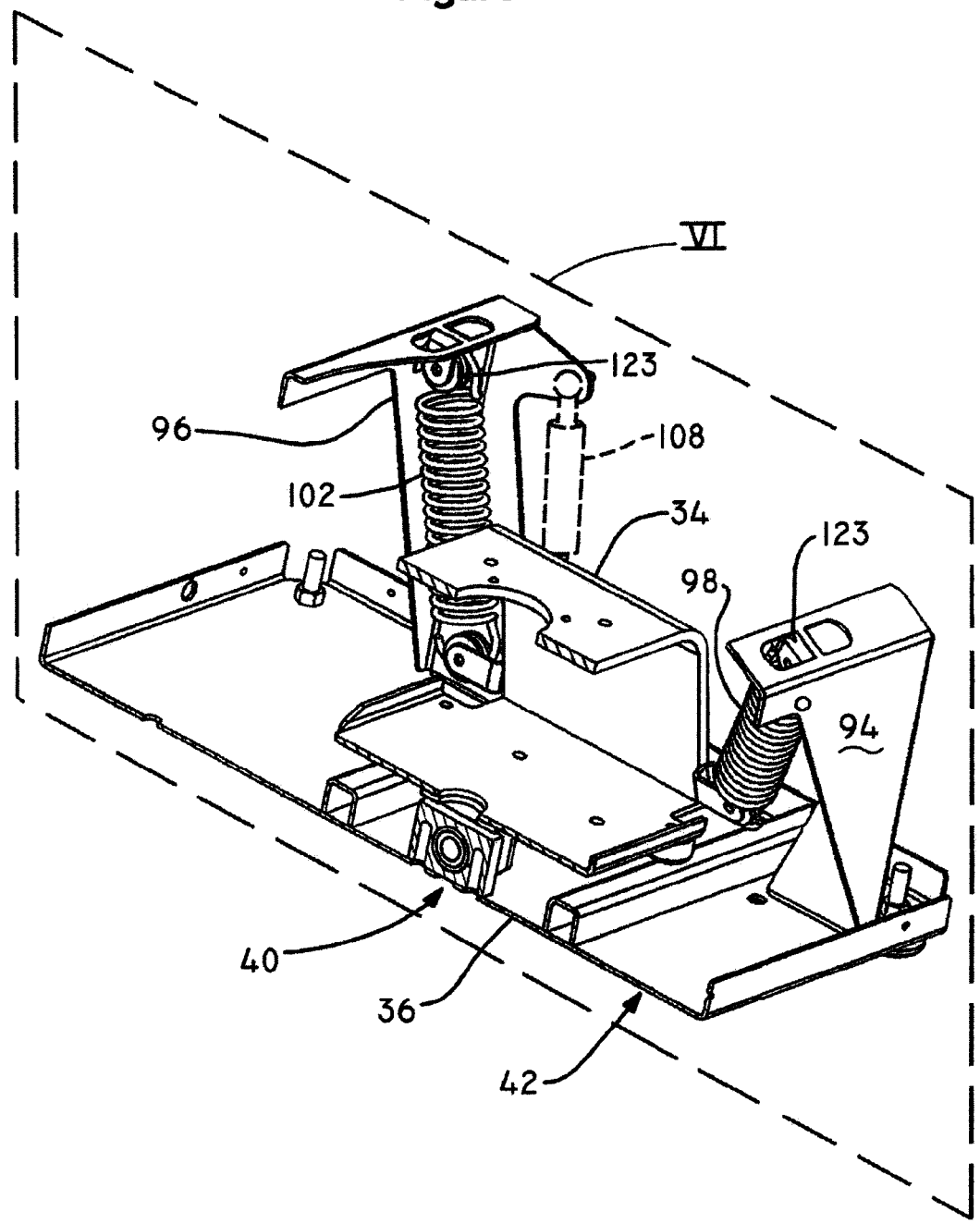
FIG. 7 is a perspective view of the parts shown in FIG. 6, along with the section plane VI.

In FIG. 6, viewing the mixer parts perpendicular to the x-z plane, it may be seen that vector components of the respective spring forces of springs 98 and 102 will exist in the x-z plane along dashed lines 114 and 116, respectively, to counteract pitch rotational movement 50' of the mixing frame assembly 38, because springs 98 and 102 are positioned at angles 118, 120, respectively. A similar effect will be produced for roll rotational movement. It may be noted that the vector components along the dashed lines mentioned correspond to certain of the springs shown in the model of FIG. 3A, and the dot dashed lines 122 extending from the dashed lines in FIG. 6 correspond to the radii in FIG. 3A through with the spring forces act to counter various rotational movements caused by imbalance of the load on mixing frame assembly 38. Similarly, the dot dashed lines 123 in FIG. 5 illustrate radii through which springs 100 and 104 act, although lines 123 are not aligned with the x, y, z coordinate system. The springs may be connected through rollers 123 secured by an axle 124 through ears 126 integrally formed in members 94, 96 at one end of the springs, and through ears 128 welded to the top mix frame weldment 34 at the other end of the springs. When used, dampers may have threaded mounting rods 130 carried by ball joints 132 and secured with nuts (not shown) either to towers 92 or to upright members 94 and 96.

Figure 8:
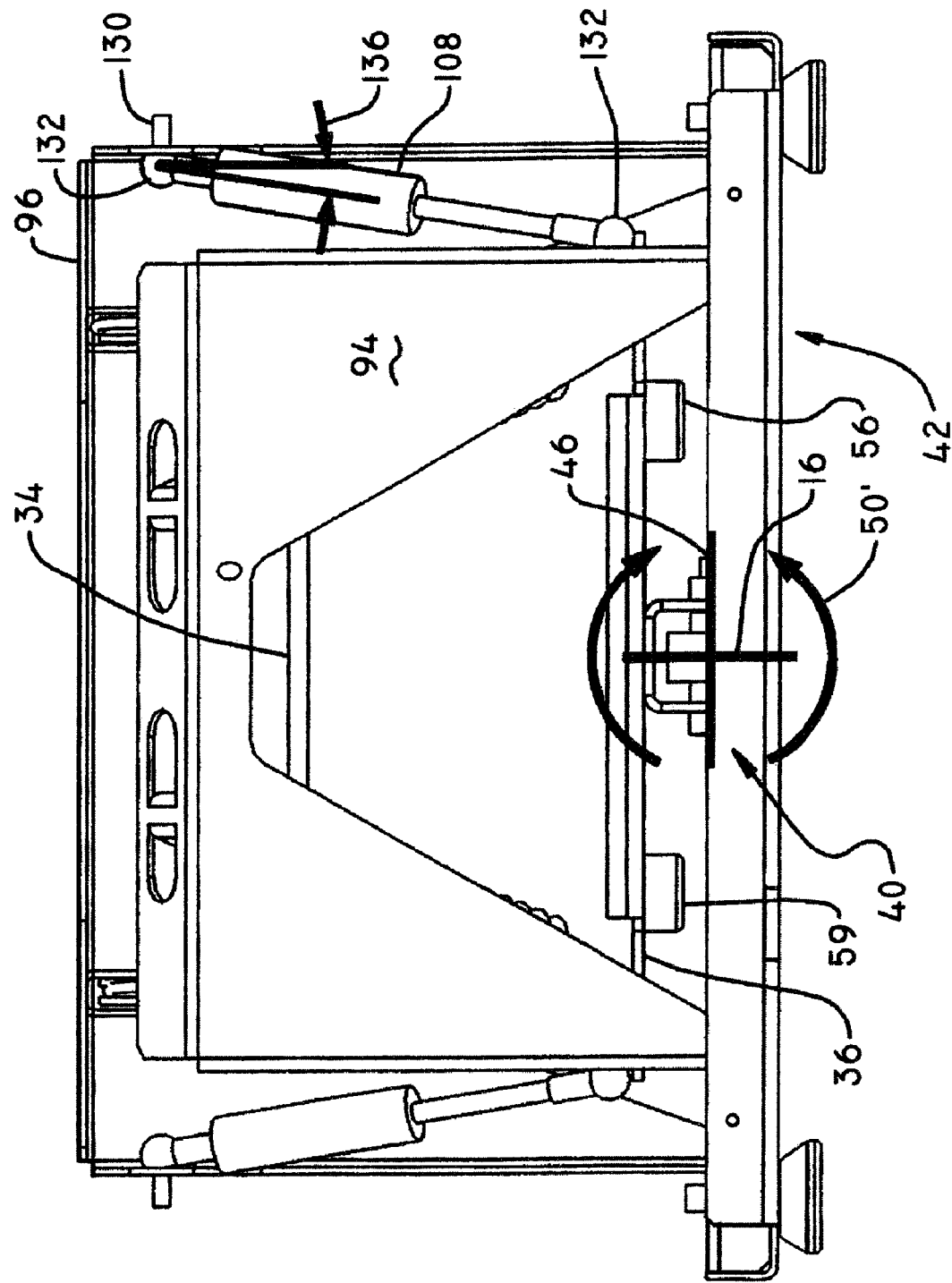
FIG. 8 is a front elevation view of the mixer parts shown in FIG. 5.
Figure 9:
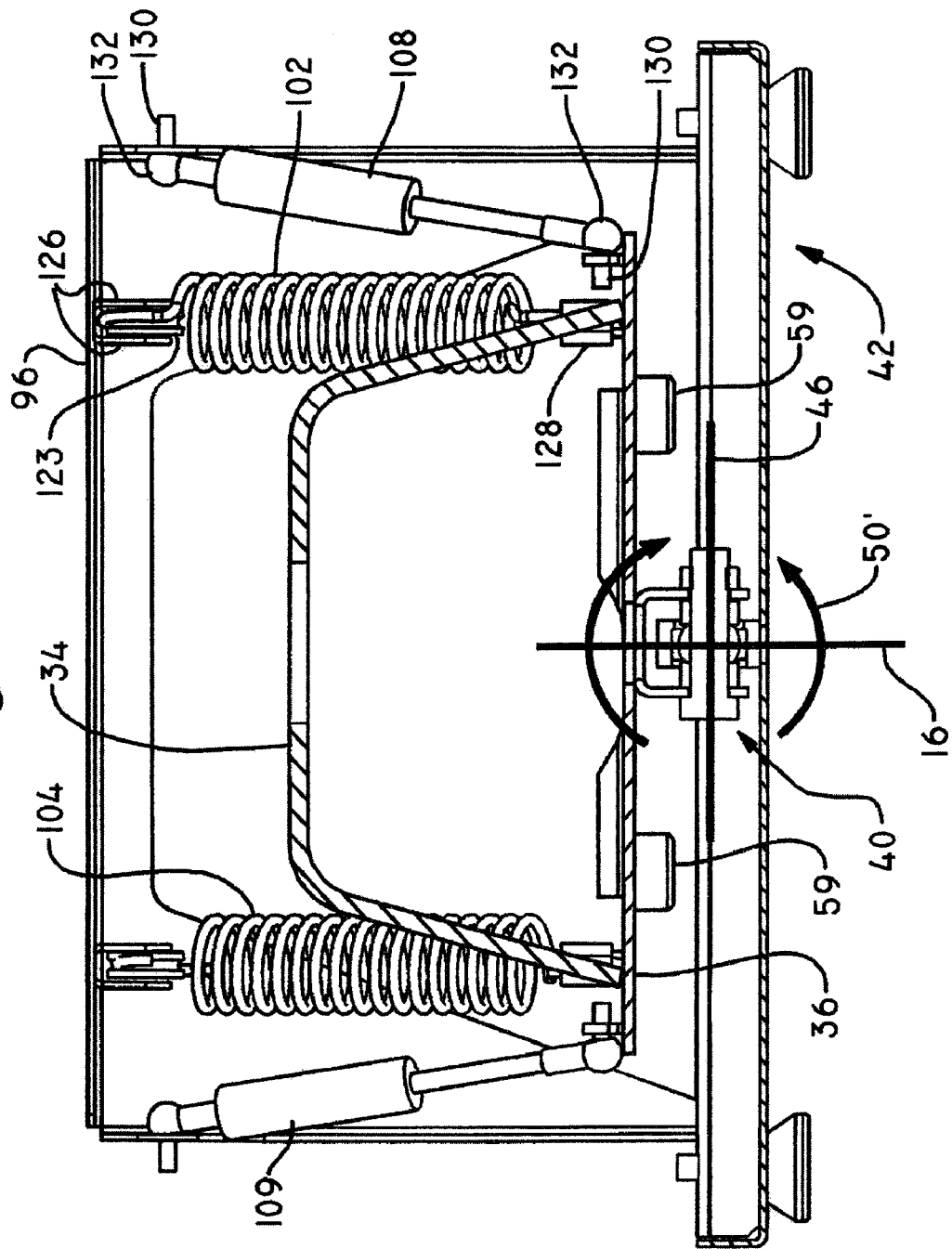
FIG. 9 is an elevation section view of the parts shown in FIG. 5, taken along line IX—IX of FIG. 5.
Figure 10:
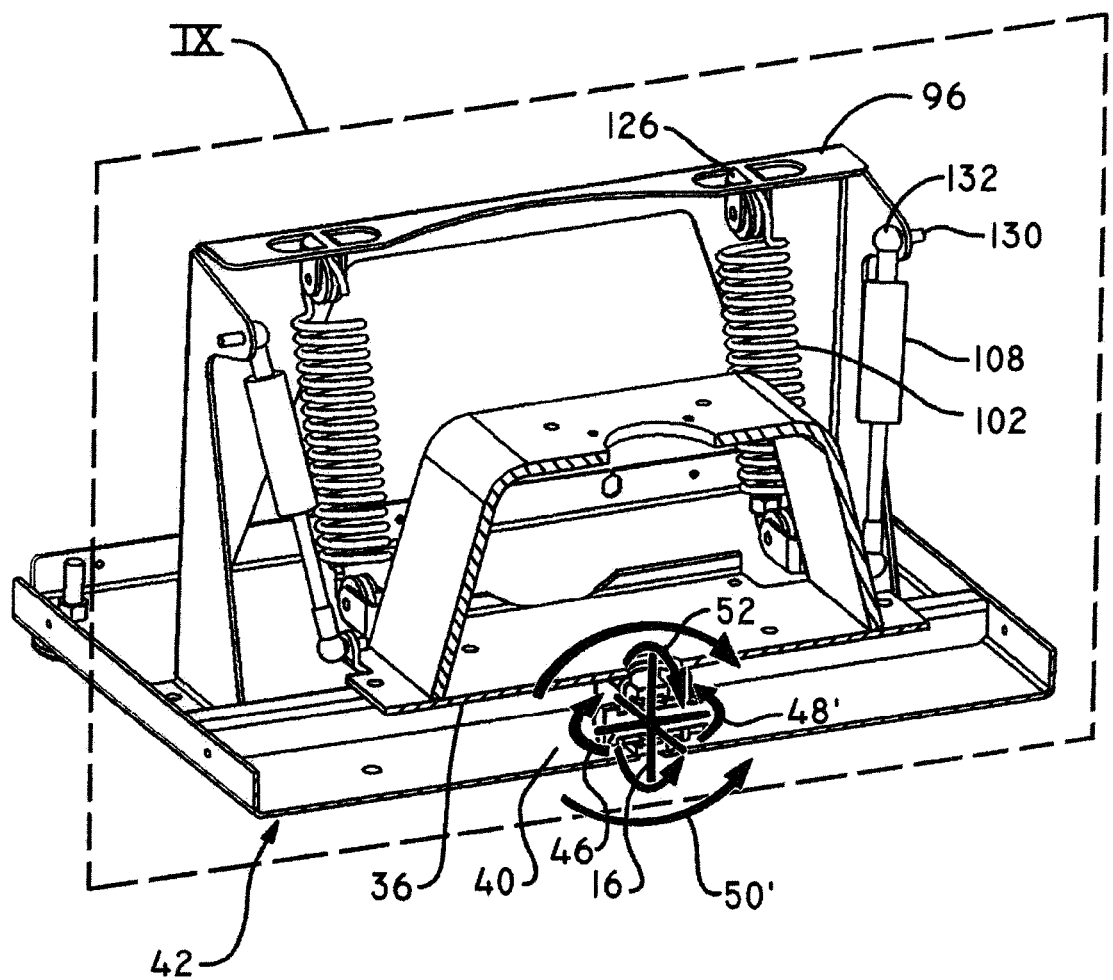
FIG. 10 is a perspective view of the parts shown in FIG. 9, along with the section plane IX.

Referring now to FIGS. 6 and 8–10, when desired, one or more dampers 108 may be used. Damper 108 is mounted at a three dimensional angle, as may be most clearly seen in FIGS. 6 and 8. Angle 134 is in the x-z plane of FIG. 6 and angle 136 in FIG. 8 is in the y-z plane, which is also the section plane in FIGS. 9 and 10. Because damper 108 (and its partner 109) are oriented primarily upright (or generally aligned with the z axis), primary damping will be for roll and pitch motions 50' and 52,' with secondary damping (because of angles 134 and 136) of yaw motion 48.'

Figure 4:
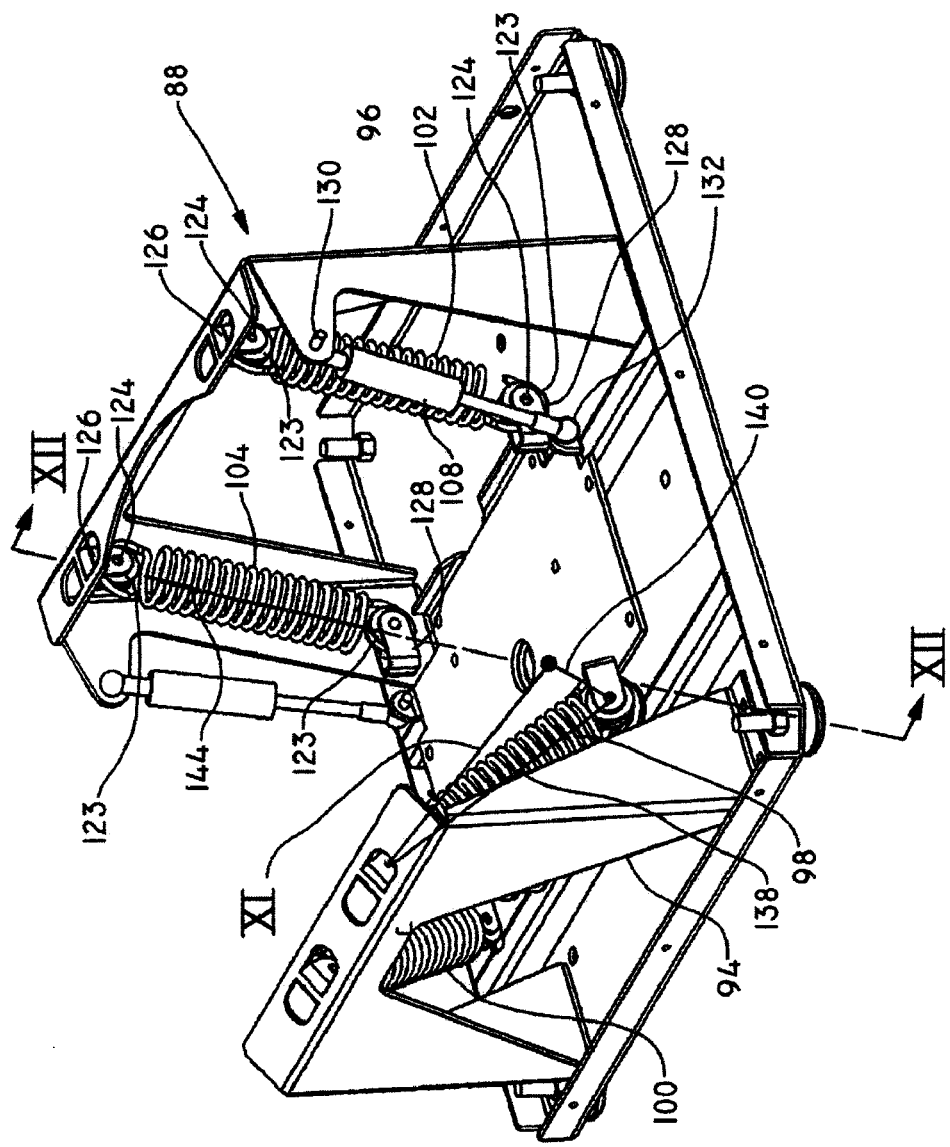
FIG. 4 is an alternative embodiment of the present invention with part removed to show certain details of the suspension system for a vortex mixer useful in the practice of the present invention.
Figure 11:
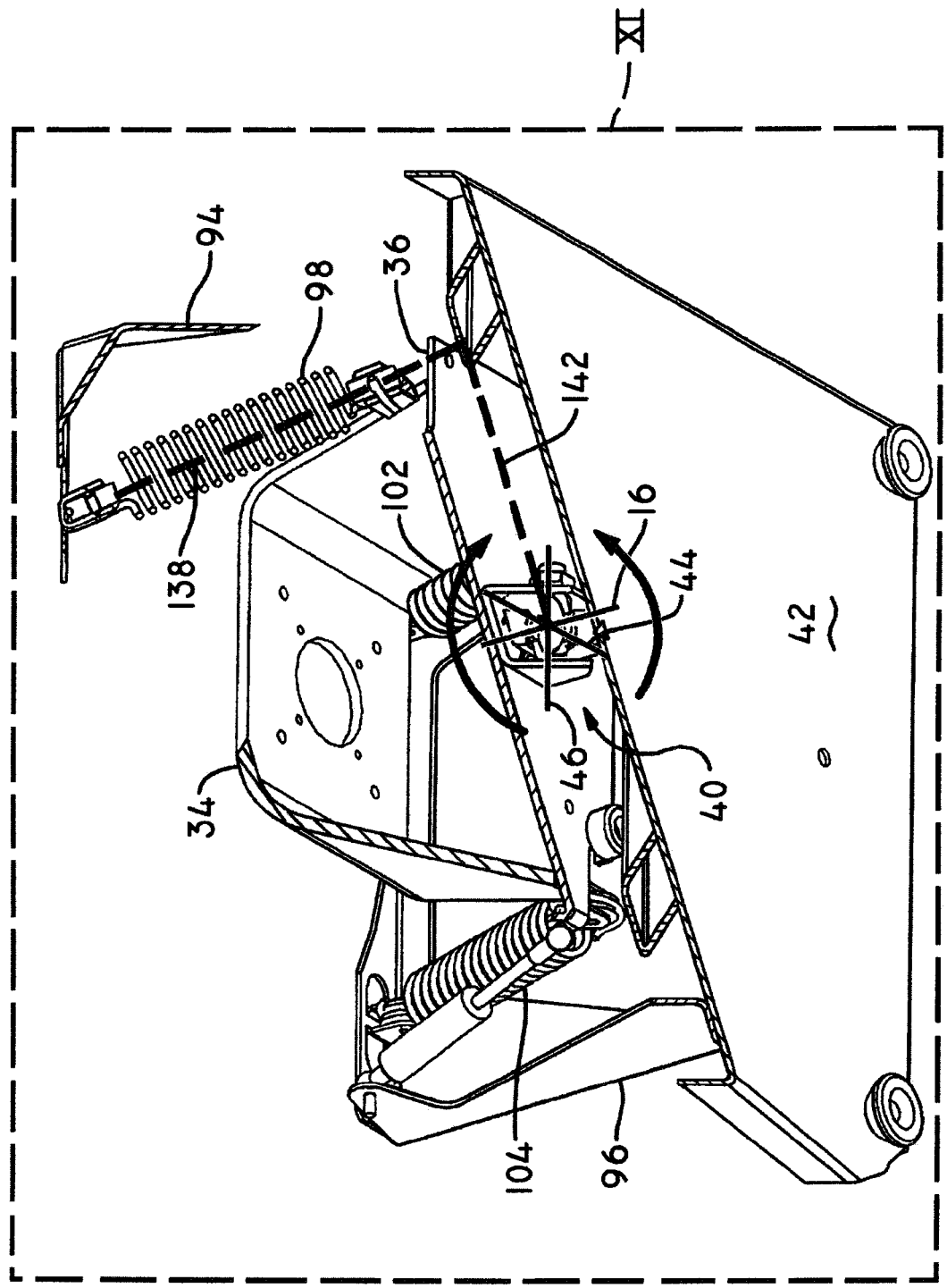
FIG. 11 is a perspective view of a section of parts shown in FIG. 5, taken along a section plane XI conforming to a plane of triangle XI in FIG. 4.

Referring now to FIG. 11 and also back to FIG. 4, a section XI through an axis 138 of spring 98 and a line 140 to the pivot may be seen in FIG. 11. The view shown in FIG. 11 is taken through the axis 138 of spring 98 and the center of the pivoting support 40. It is to be understood that line 140 in FIG. 4 is aligned with dot dashed line 142 in FIG. 11, when viewing perpendicular to the x-y plane. Line 142 corresponds to a radius or moment arm through which spring 98 acts on the mixing frame assembly 38.

Figure 12:
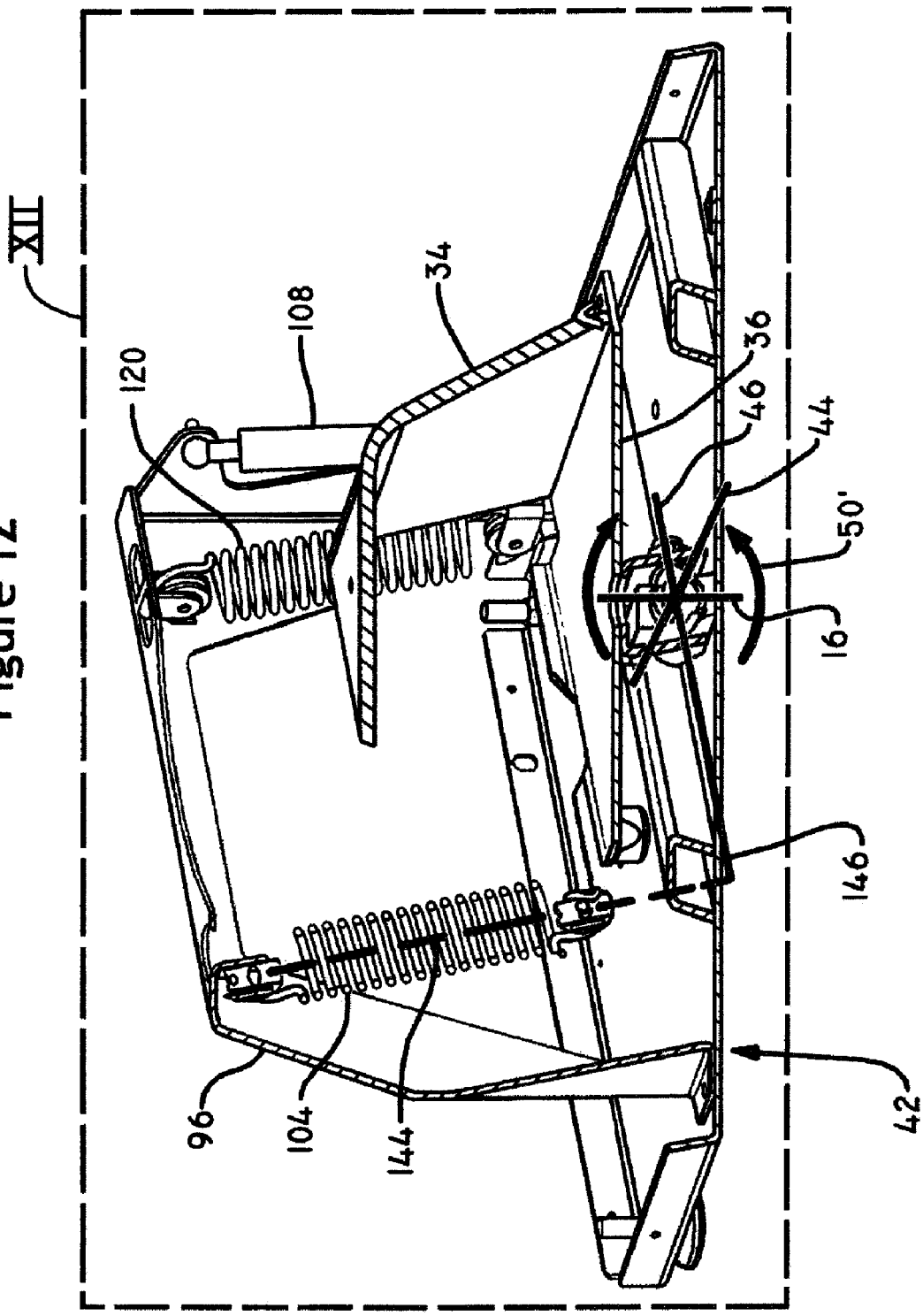
FIG. 12 is a perspective view of a section of parts shown in FIG. 5, taken along a section plane XII conforming to line XII—XII in FIG. 4.

Referring now to FIG. 12 and also back to FIG. 4, a section XII through line XII—XII may be seen in FIG. 12. The view shown in FIG. 12 is a section through an axis 144 of spring 104 and the center of pivoting support 40. It is to be understood that dot dashed line 146 corresponds to a radius or moment arm through which spring 104 acts on the mixing frame assembly 38.

One way of carrying out the present invention is as follows. The mixing frame assembly (or pivotably mounted corresponding structure) is modeled using a dynamics analysis modeler computer program. One such program suitable for this purpose is VISUAL NASTRAN 4D, available from MSC.Software, 500 Arguello Street, Suite 200, Redwood City, Calif. 9406.

The three rotational resonant modes are preferably matched to get the response to the forcing functions as clean as possible. Using equation (1) the springs are selected and oriented to achieve at least pitch and roll natural frequencies substantially below the lower of the spin and orbit forcing function frequencies corresponding to the spin and orbit rpm's. For convenience, one pair of springs (e.g., the rear springs 102 and 104) may be oriented generally vertically in the y-z plane, and another pair of springs (e.g., the front springs 98 and 100) may be used to adjust yaw response by angling each spring of that pair out of the x-z plane. Desirably each fundamental or lowest natural frequency or resonant frequency in the x, y and z rotational directions is less than 0.707 times the lowest forcing frequency that can excite such resonant frequency or frequencies. The spring constant or spring rate and/or the effective radius to the pivot location are preferably adjusted to obtain the desired matching of resonant frequencies and frequency difference(s) from the closest forcing function frequency. Normally, this is carried out using an empty mixer, since that condition will result in the highest resonant rotational frequencies, with little or no change in the forcing function frequencies between empty and loaded mixer conditions. It will be found that an angle and radius may be selected to balance or match the three lowest rotational resonance frequencies. However, it may be found unnecessary or not desirable (for example, due to space considerations in the mixer) to exactly balance all three rotational resonance frequencies. Alternatively, it may not be necessary to match, for example, the yaw resonant frequency, if yaw motion at resonance is not significant.

It is to be understood that the first set or pair of springs may in the alternative or in addition be angled, as well, if desired. FIG. 5 illustrates this option for the present invention at dashed line 106.

To address the roll motion, one may, for convenience, hold the spring constant fixed and adjust the working radius and angle of the spring to get an effective spring rate (i.e., corresponding to a spring perpendicular or orthogonal to the working radius) while remaining within the physical constraints of the mixer environment. With the arrangement shown, it is to be understood that moving springs laterally apart will increase the roll natural frequency, with all other parameters held constant, because of an increase in the effective radius.

Similarly, moving springs apart along the roll axis 44 will result in a higher pitch rotational resonance, since the effective moment arm or radius will increase, assuming all other parameter are held constant.

Starting with a vertical spring orientation and angling the spring from the vertical will increase the effect on yaw, while reducing the effect on one or both of roll and pitch (depending upon the direction of angling). In the design shown, the two front springs 98 and 100 have been angled to increase effect on yaw motion.

Adding dampers to the system is analogous to the design effort carried out for the springs. Orienting the dampers vertically results in no yaw damping, while angling the dampers will increase yaw damping, while reducing damping in one or both of the roll and pitch rotational directions. It has been found satisfactory to use only two dampers, angled to achieve sufficient damping in all three rotational directions.

Figure 13:
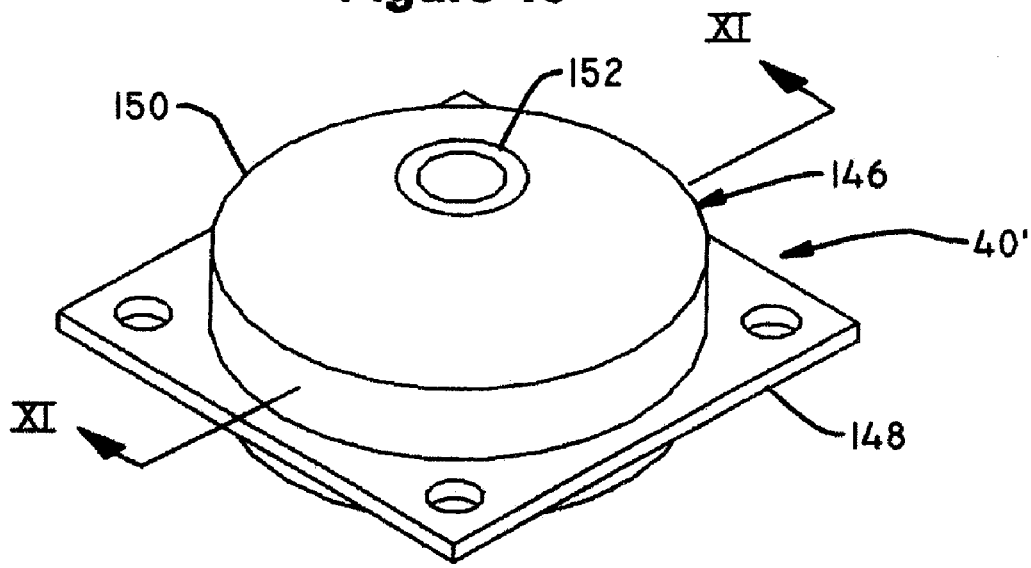
FIG. 13 is a perspective view of an alternative embodiment for a pivoting support using an elastomeric isolator in the practice of the present invention.
Figure 14:
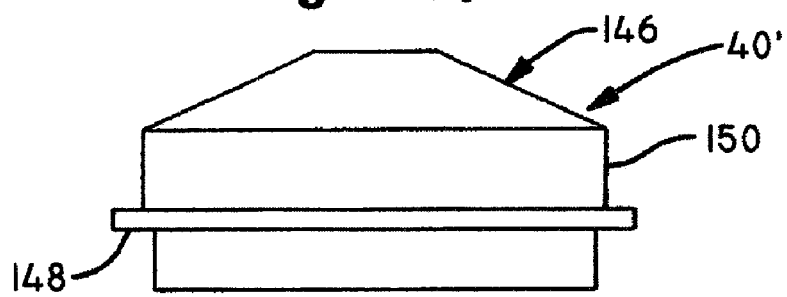
FIG. 14 is a side view of the pivoting support of FIG. 13.
Figure 15:
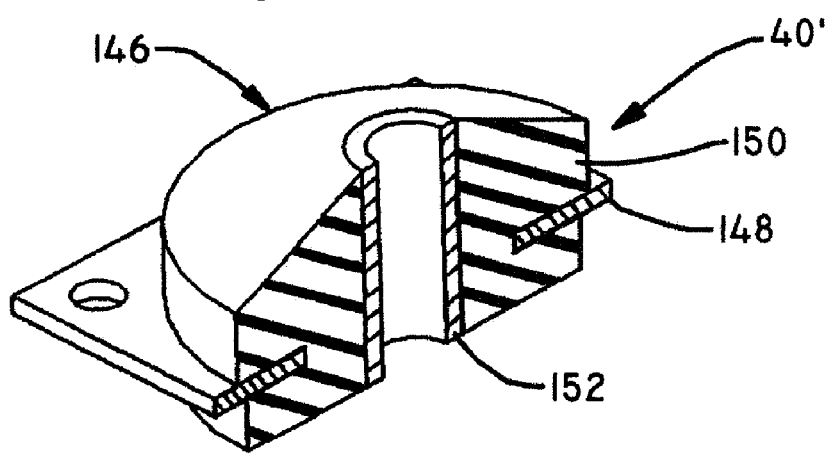
FIG. 15 is a section view in perspective of the pivoting support taken along line XV—XV of FIG. 13.

Referring now to FIGS. 13, 14, and 15, an alternative embodiment 40' for the pivoting support 40 may be seen. In this embodiment, an elastomeric shock mount isolator 146 has a steel mounting plate 148 embedded within an elastomeric body 150, made of, for example, synthetic or natural rubber. Preferably a rigid tube 152, which may also be made of steel, is molded in body 150. In use, one of the plate and tube 148, 152 is secured to the base 42 and the other of the plate and tube 148, 152 is secured to the mixing frame assembly 38, preferably at the bottom mix frame weldment 36.

As mentioned above, it is within the practice of the present invention to have a pivoting support which does not permit yaw motion. Furthermore, it is also within the scope of the present invention to have a pivoting support which has offset pivot points or locations for the respective rotational axes, in which case, the effective radii will be with respect to different planes containing the respective pivot point addressed.

One still further alternative embodiment 40″ of the pivoting support 40 is shown in FIG. 16 as a conventional U-joint 154. In use, U-joint 154 is connected between the base 42 and the mixing frame assembly 38, preferably at the bottom mix frame weldment 36.

This invention is not to be taken as limited to all of the details thereof as modifications and variations thereof may be made without departing from the spirit or scope of the invention. For example and not by way of limitation, it is within the scope of the present invention to adjust the natural frequency and resonant frequency of the mixing frame assembly by adding, subtracting or redistributing mass, which will affect the resonant frequency by altering the moments of inertia about the rotational axes of interest. The present invention is applicable to cylindrical and non-cylindrical liquid coating containers, with appropriate modifications to the holder 12. Furthermore, various types of springs and dampers may be used in the practice of the present invention, such as are well-known equivalents of the type of springs and dampers described and shown herein. It is to be understood that the actual spring rates for the various springs (or pairs or groups of springs) may be the same or different. Examples of the various types of springs include extension, compression, torsion, leaf, cantilever, hairpin and the like. Examples of various types of dampers useful in the practice of the present invention include viscous (hydraulic or pneumatic) and coulomb (friction) type dampers. Furthermore, the dampers may be unidirectional or bidirectional, as desired.

What is claimed is:

1. Apparatus for mixing paint comprising:
   a. a base;
   b. a mixing frame assembly having a predetermined mass and a corresponding mass moment of inertia for mixing a liquid coating using both spin and orbit rotational movements and wherein the assembly is mounted on the base using a pivoting support;
   c. at least one spring having an effective spring rate and connected between the mixing frame and the base wherein at least one of the effective spring rate and the mass moment of inertia of the mixing frame assembly are adjusted to maintain each of a lowest roll resonant frequency and lowest pitch resonant frequency of the mixing frame assembly substantially below the lower of a pair of forcing function frequencies corresponding to the spin and orbit rotational movements.

2. The apparatus of claim 1 wherein the at least one spring comprises a plurality of springs positioned and sized such that at least the lowest roll and lowest pitch resonant frequencies are made substantially equal.

3. The apparatus of claim 2 wherein the at least lowest resonant frequencies are each with respect to rotation about one of a pair of horizontally oriented axes.

4. The apparatus of claim 2 wherein the base includes a first plurality of towers and each spring in the plurality of springs is connected between the mixing frame assembly and a tower in the first plurality of towers.

5. The assembly of claim 4 wherein the base further includes a second plurality of towers and a plurality of dampers, with each damper in the plurality of dampers connected between the mixing frame assembly and a tower in the second plurality of towers.

6. The assembly of claim 4 further including a plurality of dampers, with each damper in the plurality of dampers connected between the mixing frame assembly and a tower in the first plurality of towers.

7. The assembly of claim 2 wherein the base includes a first upright member at least partially encircling the mixing frame assembly and each spring in the plurality of springs is connected between the mixing frame assembly and the first upright member.

8. The assembly of claim 7 further including a plurality of dampers, with each damper in the plurality of dampers connected between the mixing frame assembly and the first upright member.

9. The apparatus of claim 1 wherein the mass moment of inertia of the mixing frame assembly is for the mixing frame assembly without a paint container received in the mixing frame assembly.

10. The apparatus of claim 1 wherein the pivoting support permits the mixing frame assembly to rotate about at least two orthogonal axes through a pair of predetermined angles.

11. The apparatus of claim 1 wherein the pivoting support permits the mixing frame assembly to rotate about three mutually orthogonal axes through three respective predetermined angles.

12. The apparatus of claim 1 wherein the at least one of the effective spring rate and the mass moment of inertia are adjusted to maintain a lowest yaw resonant frequency substantially below the lower of the pair of forcing function frequencies.

13. The apparatus of claim 1 wherein the pivoting support includes a spherical bearing.

14. The apparatus of claim 1 wherein the pivoting support includes a universal joint.

15. The apparatus of claim 1 wherein the pivoting support includes an elastomeric shock mount.

16. The apparatus of claim 1 wherein the pivoting support allows pivoting about at least a pitch axis and a roll axis.

17. The apparatus of claim 16 wherein the pitch and roll axes do not intersect.

18. The apparatus of claim 1 wherein the pivoting support is free to pivot about at least one axis.

19. The apparatus of claim 1 wherein the pivoting support is free to pivot about at least two axes.

20. The apparatus of claim 1 wherein the pivoting support is free to pivot about three axes.

21. The apparatus of claim 1 further comprising at least one damper connected between the mixing frame assembly and the base.

22. The apparatus of claim 1 further comprising at least two dampers connected between the mixing frame assembly and the base to damp motion about at least two mutually orthogonal axes.

23. The apparatus of claim 22 wherein the at least two mutually orthogonal axes include a pitch axis and a roll axis.

24. A method of reducing vibration in a vortex mixer of the type having a paint container holder assembly for holding a paint container and rotating the paint container about a spin axis passing through the paint container in the holder and an orbit axis arranged at an angle to the spin axis, the method comprising the steps of:
- a. supporting the paint container holder assembly for pivoting movement about a pivoting support with respect to a base; and
- b. adjusting a lowest rotational resonant frequency of the paint container holder assembly without the paint container to be substantially below a lower of a pair of forcing function frequencies corresponding to the spin and orbit rotational velocities.

25. The method of claim 24 wherein step b further comprises adjusting the lowest rotational resonant freqency to be less than about 0.7 times the lowest forcing function frequency.

26. The method of claim 24 further wherein step b further comprises suspending the paint container holder assembly by at least one spring spaced apart from the pivoting support and selecting an effective spring rate for the at least one spring for adjusting the lowest resonant frequency of the assembly.

27. The method of claim 24 further wherein step b further comprises suspending the paint container holder assembly by at least one spring spaced apart from the pivoting support and adjusting a distance the at least one spring is spaced apart from the pivoting support for adjusting the lowest resonant frequency of the assembly.

28. The method of claim 24 further wherein step b further comprises suspending the paint container holder assembly by at least one spring spaced apart from the pivoting support and selecting:
- i. an effective spring rate for the at least one spring, and
- ii. a distance the at least one spring is spaced apart from the pivoting support for adjusting the lowest resonant frequency of the assembly.

29. The method of claim 28 further wherein the at least one spring comprises a plurality of springs and step b is repeated for each of at least two rotational degrees of freedom for the assembly and the plurality of springs are selected and positioned to simultaneously provide that the lowest resonant frequencies of the at least two rotational degrees of freedom for the assembly are substantially below the lower of the forcing function frequencies.

30. The method of claim 24 further comprising an additional step of:
- c. adjusting at least two rotational resonance frequencies of the paint container holder assembly to be substantially equal.

31. The method of claim 24 wherein a yaw rotational axis is coincident with an orbit axis of rotation and a roll rotational axis and a pitch rotational axis are orthogonal to the yaw axis and to each other, and the lowest rotational resonant frequency of the paint container holder assembly corresponds to a natural frequency of rotational motion about at least one of the pitch and roll axes.

32. The method of claim 31 wherein step b further comprises adjusting each of the lowest rotational resonant frequencies of the paint container holder assembly in directions of rotation about the roll and pitch axes to each be substantially below the forcing function frequencies.

33. The method of claim 32 wherein each of the lowest rotational resonant frequencies are adjusted to be less than about 0.7 times the lowest forcing function frequency.

34. The method of claim 24 further comprising an additional step c of:
- c. connecting at least one damper to the paint container holder assembly for damping rotational motion of the assembly.

35. The method of claim 34 wherein the at least one damper damps rotational motion of the assembly about at least one axis of rotation passing through the pivoting support.

36. The method of claim 35 wherein the at least one damper damps rotational motion of the assembly about at least two axes of rotation.

37. The method of claim 35 wherein the at least one damper comprises a pair of dampers, each effective to damp rotational motion of the assembly about at least a roll and a pitch axis.

38. The method of claim 24 wherein step b is performed by adjusting the ratio of spring rate to mass moment of inertia.

39. The method of claim 38 wherein step b is performed for each of at least two rotational degrees of freedom of the paint container holder assembly.

40. The method of claim 39 wherein the at least two rotational degrees of freedom are orthogonal to an orbit axis of the vortex mixer.

41. The method of claim 39 wherein step b is performed for each of three rotational degrees of freedom.

42. A method of reducing vibration in a paint mixer of the type having a paint container holder assembly for holding a paint container and rotating the paint container about a spin axis passing through the paint container in the holder and an orbit axis arranged at an angle to the spin axis, the method comprising the steps of:
- a. supporting the paint container holder assembly for pivoting movement about a pivoting support with respect to a base;
- b. matching at least two lowest rotational natural frequencies of the paint container holder assembly without the paint container to be substantially equal; and
- c. adjusting the lowest rotational natural frequency of the paint container holder assembly without the paint container to be substantially below a lower of a pair of forcing function frequencies corresponding to the spin and orbit rotational velocities.

43. The method of claim 42 wherein the paint mixer has a yaw axis aligned with the orbit axis and step b includes matching at least a lowest roll natural frequency and a lowest pitch natural frequency for rotational movement about a roll axis and a pitch axis, each orthogonal to the yaw axis.

* * * * *